(12) United States Patent
Maguire

(10) Patent No.: US 10,138,076 B2
(45) Date of Patent: Nov. 27, 2018

(54) METHOD FOR RESIN DELIVERY INCLUDING METERING INTRODUCTION OF EXTERNAL AIR TO MAINTAIN DESIRED VACUUM LEVEL

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 0 days.

(21) Appl. No.: 15/052,126

(22) Filed: Feb. 24, 2016

(65) Prior Publication Data
US 2016/0244275 A1 Aug. 25, 2016

Related U.S. Application Data

(60) Provisional application No. 62/120,401, filed on Feb. 25, 2015.

(51) Int. Cl.
*B65G 53/66* (2006.01)
*B65G 53/24* (2006.01)

(52) U.S. Cl.
CPC ............. *B65G 53/66* (2013.01); *B65G 53/24* (2013.01)

(58) Field of Classification Search
CPC ........................... B65B 53/66; B65B 2812/16
USPC ...................... 406/14, 34, 144, 151
See application file for complete search history.

(56) References Cited

U.S. PATENT DOCUMENTS

| | | |
|---|---|---|
| 1,001,510 A | 8/1911 | Curbey |
| 1,418,096 A | 5/1922 | Royer |
| 1,579,251 A | 4/1926 | Schossow |
| 2,116,912 A | 5/1938 | Richardson |
| 2,161,190 A | 6/1939 | Paull |
| 2,351,035 A | 6/1944 | Grant, Jr. |
| 2,403,689 A | 7/1946 | Sprague |
| 2,601,654 A | 6/1952 | Wright |
| 2,655,934 A | 10/1953 | Charles |
| 2,718,435 A | 9/1955 | Hudspeth |
| 2,765,812 A | 10/1956 | Werner |
| 2,917,077 A | 12/1959 | Ziege |
| 3,111,115 A | 11/1963 | Best |
| 3,115,276 A | 12/1963 | Johanningmeier |
| 3,122,162 A | 2/1964 | Sands |
| 3,151,628 A | 10/1964 | Heckert |
| 3,164,141 A | 1/1965 | Jones |
| 3,209,898 A | 10/1965 | Beebe et al. |

(Continued)

FOREIGN PATENT DOCUMENTS

| | | |
|---|---|---|
| CN | 202302166 U | 7/2012 |
| DE | 3541532 A1 | 5/1986 |

(Continued)

OTHER PUBLICATIONS

Sheet of 2 photographs of Mould-Tek gravimetric blender, circa 1993.

(Continued)

*Primary Examiner* — Joseph A Dillon, Jr.
(74) *Attorney, Agent, or Firm* — Fox Rothschild LLP

(57) ABSTRACT

Method and apparatus for pneumatically conveying granular plastic resin material out of a resin supply to a process machine includes a vacuum pump, a conduit connecting the resin supply to a suction intake of the vacuum pump, a sensor for sensing vacuum level drawn by the pump at the suction inlet and a valve for supplying air to the conduit.

13 Claims, 2 Drawing Sheets

(56) References Cited

U.S. PATENT DOCUMENTS

| | | |
|---|---|---|
| 3,239,278 A | 3/1966 | Mueller |
| 3,348,848 A | 10/1967 | Lucking et al. |
| 3,367,362 A | 2/1968 | Hoffman |
| 3,381,708 A | 5/1968 | Chenoweth |
| 3,434,493 A | 3/1969 | Owens |
| 3,468,338 A | 9/1969 | Patterson |
| 3,470,994 A | 10/1969 | Schnell et al. |
| 3,621,873 A | 11/1971 | Kenann et al. |
| 3,667,087 A | 6/1972 | Dakin |
| 3,735,777 A | 5/1973 | Katzer et al. |
| 3,773,300 A | 11/1973 | Hauser |
| 3,794,077 A | 2/1974 | Fanshier |
| 3,861,830 A | 1/1975 | Johnson |
| 3,872,884 A | 3/1975 | Busdiecker |
| 3,931,953 A | 1/1976 | Allen |
| 3,951,461 A | 4/1976 | De Feudis |
| 3,959,636 A | 5/1976 | Johnson et al. |
| 3,985,262 A | 10/1976 | Nauta |
| 4,005,908 A | 2/1977 | Freeman |
| 4,026,442 A | 5/1977 | Orton |
| 4,108,334 A | 8/1978 | Moller |
| 4,148,100 A | 4/1979 | Moller |
| 4,174,731 A | 11/1979 | Sturgis |
| 4,183,467 A | 1/1980 | Sheraton |
| 4,219,136 A | 8/1980 | Williams et al. |
| 4,221,510 A | 9/1980 | Smith |
| 4,262,878 A | 4/1981 | O'ffill |
| 4,269,223 A | 5/1981 | Carter et al. |
| 4,284,261 A | 8/1981 | Benjamin |
| 4,294,020 A | 10/1981 | Evans |
| 4,342,443 A | 8/1982 | Wakeman |
| 4,354,622 A | 10/1982 | Wood |
| 4,373,838 A | 2/1983 | Foreman |
| 4,402,436 A | 9/1983 | Hellgren |
| 4,402,635 A | 9/1983 | Maruo |
| 4,454,943 A | 6/1984 | Moller |
| 4,475,672 A | 10/1984 | Whitehead |
| 4,498,783 A | 2/1985 | Rudolph |
| 4,501,518 A | 2/1985 | Smith |
| 4,508,091 A | 4/1985 | Wakeman |
| 4,511,291 A | 4/1985 | Quates, Sr. |
| 4,525,071 A | 6/1985 | Horowitz et al. |
| 4,581,704 A | 4/1986 | Mitsukawa |
| 4,586,854 A | 5/1986 | Newman |
| 4,705,083 A | 11/1987 | Rossetti |
| 4,756,348 A | 7/1988 | Moller |
| 4,793,711 A | 12/1988 | Ohlson |
| 4,812,086 A | 3/1989 | Kopernicky |
| 4,830,508 A | 5/1989 | Higuchi et al. |
| 4,834,385 A | 5/1989 | Jackson |
| 4,842,198 A | 6/1989 | Chang |
| 4,848,534 A | 7/1989 | Sandwall |
| 4,850,703 A | 7/1989 | Hanaoka et al. |
| 4,962,831 A | 10/1990 | Dundas |
| 4,995,422 A | 2/1991 | Chew |
| 5,011,043 A | 4/1991 | Whigham |
| 5,054,965 A | 10/1991 | Clark |
| 5,110,521 A | 5/1992 | Moller |
| 5,116,547 A | 5/1992 | Tsukahara et al. |
| 5,132,897 A | 7/1992 | Allenberg |
| 5,143,166 A | 9/1992 | Hough |
| 5,147,152 A | 9/1992 | Link |
| 5,148,943 A | 9/1992 | Moller |
| 5,172,489 A | 12/1992 | Moller |
| 5,225,210 A | 7/1993 | Shimoda |
| 5,232,314 A | 8/1993 | Hopkins |
| 5,244,179 A | 9/1993 | Wilson |
| 5,252,008 A | 10/1993 | May, III et al. |
| 5,261,743 A | 11/1993 | Moller |
| 5,285,930 A | 2/1994 | Nielsen |
| 5,340,949 A | 8/1994 | Fujimura et al. |
| 5,341,961 A | 8/1994 | Hausam |
| 5,378,089 A | 1/1995 | Law |
| 5,415,321 A | 5/1995 | Gehlert |
| 5,423,455 A | 6/1995 | Ricciardi et al. |
| 5,575,309 A | 11/1996 | Connell |
| 5,575,596 A | 11/1996 | Bauer |
| 5,613,516 A | 3/1997 | Landrum |
| 5,651,401 A | 7/1997 | Cados |
| 5,669,265 A | 9/1997 | Adler |
| 5,704,391 A | 1/1998 | McGowan et al. |
| 5,767,453 A | 6/1998 | Wakou et al. |
| 5,767,455 A | 6/1998 | Mosher |
| 5,780,779 A | 7/1998 | Kitamura et al. |
| 5,791,830 A | 8/1998 | Fort |
| 5,794,789 A | 8/1998 | Payson |
| 5,843,513 A | 12/1998 | Wilke et al. |
| 6,007,236 A | 12/1999 | Maguire |
| 6,036,407 A | 3/2000 | Nester |
| 6,076,803 A | 6/2000 | Johnson |
| 6,085,777 A | 7/2000 | Welker |
| 6,089,794 A | 7/2000 | Maguire |
| 6,102,629 A | 8/2000 | Ishida |
| 6,152,656 A | 11/2000 | Curtis et al. |
| 6,158,363 A | 12/2000 | Memory et al. |
| 6,199,583 B1 | 3/2001 | Iacovella |
| 6,227,768 B1 | 5/2001 | Higuchi |
| 6,379,086 B1 | 4/2002 | Goth |
| 6,386,800 B1 | 5/2002 | van Eyck |
| 6,413,020 B1 | 7/2002 | Davison |
| 6,419,418 B1 | 7/2002 | Smith |
| 6,447,215 B1 * | 9/2002 | Wellmar ............... B65G 53/66 406/11 |
| 6,497,083 B1 | 12/2002 | Garwood |
| 6,585,004 B1 | 7/2003 | Porter |
| 6,588,988 B2 * | 7/2003 | Zlotos ................... B65G 53/24 406/14 |
| 6,634,375 B2 | 10/2003 | Olivas |
| 6,644,345 B2 | 11/2003 | Dulin |
| 6,648,558 B1 | 11/2003 | Shultz |
| 6,786,681 B2 * | 9/2004 | Grasshoff .............. B65G 53/28 406/11 |
| 6,834,755 B2 | 12/2004 | Jay |
| 6,871,618 B2 | 3/2005 | Masse |
| 6,890,129 B2 | 5/2005 | Fabbri |
| 6,923,601 B2 * | 8/2005 | Goth ...................... B65G 53/24 406/152 |
| 6,942,133 B2 | 9/2005 | Frankeberger |
| 6,981,619 B2 | 1/2006 | Moretto |
| 7,066,689 B2 | 6/2006 | Maguire |
| 7,080,960 B2 * | 7/2006 | Burnett ................. B65G 43/08 406/11 |
| 7,114,889 B2 | 10/2006 | Kanou |
| 7,117,886 B2 | 10/2006 | Kajitani |
| 7,137,729 B2 | 11/2006 | Moretto |
| 7,188,434 B2 | 3/2007 | Moretto |
| 7,191,807 B2 | 3/2007 | DeMaison |
| 7,192,222 B2 * | 3/2007 | Van Mullekom ...... B65G 53/28 406/151 |
| 7,231,927 B2 | 6/2007 | Suehara |
| 7,311,474 B1 | 12/2007 | Ogasahara |
| 7,318,459 B2 | 1/2008 | Frankeberger |
| 7,384,018 B2 | 6/2008 | Moretto |
| 7,472,494 B2 | 1/2009 | Moretto |
| 7,503,128 B2 | 3/2009 | Moretto |
| 7,662,211 B2 | 2/2010 | Federico |
| 7,766,037 B2 | 8/2010 | Moenkhaus |
| 7,766,305 B2 | 8/2010 | Kim |
| 8,021,462 B2 | 9/2011 | Moretto |
| D650,888 S | 12/2011 | Moretto |
| 8,070,844 B2 | 12/2011 | Maguire |
| 8,092,070 B2 | 1/2012 | Maguire |
| 8,113,745 B2 | 2/2012 | Aoki |
| D671,563 S | 11/2012 | Moretto |
| D671,564 S | 11/2012 | Moretto |
| 8,322,951 B2 | 12/2012 | Kvalheim |
| 8,360,691 B2 | 1/2013 | Moretto |
| 8,408,228 B1 | 4/2013 | Jimenez |
| 8,412,383 B2 | 4/2013 | Moretto |
| D688,711 S | 8/2013 | Moretto |
| 8,672,194 B2 | 3/2014 | Moretto |
| 8,753,432 B2 | 6/2014 | Maguire |
| 8,763,273 B2 | 7/2014 | Moretto |
| 8,793,900 B2 | 8/2014 | Moretto |

(56) References Cited

U.S. PATENT DOCUMENTS

| | | | |
|---|---|---|---|
| D718,791 S | 12/2014 | Moretto | |
| 8,905,681 B2 | 12/2014 | Schneider | |
| 8,914,990 B2 | 12/2014 | Moretto | |
| 9,181,044 B1* | 11/2015 | Baker | B65G 53/525 |
| 9,365,367 B2* | 6/2016 | Kraemer | B65G 53/06 |
| 9,371,198 B2 | 6/2016 | Maguire | |
| 9,459,183 B1 | 10/2016 | Schnakenberg | |
| 9,550,635 B2 | 1/2017 | Maguire | |
| 9,550,636 B2 | 1/2017 | Maguire | |
| 9,604,793 B2 | 3/2017 | Maguire | |
| 9,637,320 B2 | 5/2017 | Moretto | |
| 9,663,263 B2 | 5/2017 | Moretto | |
| 2002/0061232 A1 | 5/2002 | Zlotos | |
| 2002/0136609 A1 | 9/2002 | Maguire | |
| 2003/0168618 A1 | 9/2003 | Coney | |
| 2004/0115013 A1 | 6/2004 | Goth | |
| 2004/0221893 A1 | 11/2004 | Johnson | |
| 2005/0012058 A1 | 1/2005 | Medina | |
| 2005/0039816 A1 | 2/2005 | Maguire | |
| 2005/0089378 A1* | 4/2005 | Gerber | B65G 53/66 406/10 |
| 2005/0265793 A1 | 12/2005 | Van Mullekom | |
| 2008/0314461 A1* | 12/2008 | Moretto | B65G 53/66 137/571 |
| 2009/0031580 A1 | 2/2009 | Moretto | |
| 2009/0039106 A1 | 2/2009 | Moretto | |
| 2009/0090018 A1 | 4/2009 | Moretto | |
| 2009/0151800 A1 | 6/2009 | Salmento | |
| 2009/0295016 A1 | 12/2009 | Shinohara | |
| 2011/0211919 A1* | 9/2011 | Rasner | B65G 53/24 406/14 |
| 2011/0299943 A1 | 12/2011 | Woolever | |
| 2012/0201917 A1 | 8/2012 | Shinohara | |
| 2013/0202370 A1* | 8/2013 | Moretto | B65G 53/66 406/151 |
| 2013/0209180 A1 | 8/2013 | Moretto | |
| 2015/0175282 A1 | 6/2015 | Thompson | |
| 2015/0232287 A1 | 8/2015 | Maguire | |
| 2015/0232289 A1 | 8/2015 | Maguire | |
| 2015/0232290 A1 | 8/2015 | Maguire | |
| 2015/0308584 A1 | 10/2015 | Ehrne | |
| 2015/0321860 A1 | 11/2015 | Maguire | |
| 2016/0096693 A1* | 4/2016 | Hanaoka | B65G 53/66 406/19 |
| 2016/0158967 A1 | 6/2016 | Maguire | |
| 2016/0167897 A1 | 6/2016 | Wiemers | |
| 2016/0272439 A1* | 9/2016 | Kelly | B65G 53/66 |
| 2016/0280473 A1* | 9/2016 | Veselov | B65G 53/24 |
| 2016/0292953 A1 | 10/2016 | Brown | |
| 2016/0347557 A1* | 12/2016 | Tell | B65G 53/24 |
| 2017/0174447 A1* | 6/2017 | Baker | B65G 51/16 |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "NEW FROM HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender the Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.

(56) References Cited

OTHER PUBLICATIONS

Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc*.
Four page two-sided color brochure entitled "Novatec Inc. Vacuum Loaders—Electro-Polished Stainless Steel Finish" of Novatec Inc., undated*.
Eight page two-sided color brochure entitled "Novatec Inc. Material Conveying Solutions for the Plastics Industry", 1999*.
Two page two-sided color brochure entitled Maguire Model MPM Pre-Mixers of Maguire Products, Inc., Apr. 1997*.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries as Primary", AEC, Inc., 1999.
Written Opinion for PCT Application No. PCT/US2016/12411, dated Mar. 2, 2016.
International Search Report for PCT Application No. PCT/US2016/12411, dated Mar. 2, 2016.
Written Opinion for PCT Application No. PCT/US2016/19455, dated May 13, 2016.
International Search Report for PCT Application No. PCT/US2016/19455, dated May 13, 2016.
Introduction to Pneumatic Conveying of Solids, Karl Jacob, The Dow Chemical Company, originally delivered on Sep. 8, 2010.

* cited by examiner

METHOD FOR RESIN DELIVERY INCLUDING METERING INTRODUCTION OF EXTERNAL AIR TO MAINTAIN DESIRED VACUUM LEVEL

CROSS-REFERENCE TO RELATED PATENT APPLICATIONS

This patent application claims the benefit of the prior of U.S. provisional application Ser. No. 62/120,401 filed 25 Feb. 2015 for "Method for Resin Delivery by Metering Introduction of External Air to Maintain Desired Vacuum Level", which application was filed in the name of Stephen B. Maguire. The benefit of the claim to the priority of the 25 Feb. 2015 filing date of the provisional application is claimed under 35 USC 119 and 120.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

BACKGROUND OF THE INVENTION

The plastics industry is very diversified; there are thousands of different products, hundreds of materials, dozens of processes, and all are very different from one another. The only thing all these differences share in common is that the source material is some type of plastic.

Equipment sold to this industry is, therefore, very diversified in design. Plastics factories have multiple process machines, sometimes several hundred in one location. Virtually all plastics fabricating operations require that each process machine, namely a molding press or an extruder, be supplied automatically with the required raw resin material on a continuous basis. This resin may be supplied in large boxes, called Gaylords, in fiber drums, in 50 pound bags, or more typically may be delivered by bulk truck or rail car, with the resin material then being transferred in bulk into storage silos. In all cases the resin material must be further distributed throughout the plant to each and every process machine. For that reason a great deal of design and capital expense is devoted to the automatic distribution of the raw resin material throughout the plant.

These resin distribution systems, more commonly referred to as "Loading Systems", must deal with many variables. One set of variables includes the type, shape, size and consistency of the granular material.

Resin pellets, nominally about ⅛ inch in size, come in various shapes, with round, square, and cylindrical being the most common.

Flowing resin powder is also an option, and very fine but free flowing resin pellets and other granular materials may be conveyed as well, The design variables to be considered for each customer include:
1. Type of resin being conveyed.
2. Size and consistency of the resin pellets.
3. Distances the resin pellets are to be conveyed.
4. Variability of these distances from shortest to longest.
5. Acceptable range for velocity of resin material travel through the lines.
6. Throughput rate of resin required for each machine.
7. Total throughput rate of resin for the entire plant.
8. Excess capacity performance margin so a molding or extrusion process is not interrupted by short term loading issues.
9. Loss of resin material from or at the supply so that only air is being pulled, thereby reducing system vacuum levels and reducing overall design throughput.
10. Loading sequence, or priority, when multiple receiver stations call for material.
11. Detecting problems and alarm conditions.
12. Proper air to material ratio for resin conveying.
13. Detecting plugged lines due to poor resin flow or over feeding of resin material.
14. Dust condition and filter requirements.
15. Reliability.
16. Serviceability.
17. Ease of use.
18. Cost
19. Vacuum pump type, namely positive displacement, regenerative, and others.
20. Vacuum pump horsepower and rated CFM capacity as well as vacuum levels.

In all of these areas, system designers look to find improved methods and solutions whenever possible.

One of the most important considerations is to hold a correct velocity for the conveyed resin material. The type of resin material dictates the target conveying speed. To maximize the resin material transfer rate, a high conveying speed is preferred, and air speed in any case must be sufficient to keep the resin pellets suspended and moving in the air stream. But velocity must be limited so as not to damage the pellets. Hard brittle pellets can fracture and break when conveyed, resulting in excessive dust.

Softer pellets can skid along the conduit walls, causing "angel hair" as a result of the plastic resin melting at the point of high speed contact with the conduit wall; this leaves a thin film on the wall. Strings of very thin "angel hair" accumulate, effectively reducing diameter of the conduit and causing problems in the system.

Air speed and resin conveying velocity are directly related to pump capacity (rated CFM) and horsepower, as well as conveying line diameter. There is always a correct velocity "range" for each type of resin material. It is a design challenge to assure that resin material is conveyed within the correct velocity range.

Conveying distances affect system design. Conveying over short distances requires a less powerful vacuum source then over longer distances. Systems are generally sized to produce the best compromise for material velocity between the shortest and longest conveying distance.

Required conveying rate usually dictates line size (tube diameter), and this in turn dictates the CFM required to maintain correct velocity in a given diameter conduit. This means different tube sizes in the same system can be a problem if one vacuum pump is to draw air and resin through several different diameter conveying lines. Pumps have known CFM ratings. Pulling air through a small tube will result in higher velocity flow than pulling the same CFM through a larger tube.

Excessive velocity can damage pellets.

The type of vacuum pump to be selected is important. Regenerative blowers deliver wide ranging CFM depending on vacuum level. Positive displacement type pumps deliver high vacuum levels, and have a flatter CFM curve over their vacuum range. Regenerative blowers are quieter and generally cost less. Positive displacement blowers may require sound enclosures and tend to cost more, but are generally more reliable and more forgiving as respecting dust in the air.

The simplest systems use a fixed speed motor to drive the vacuum pump, and a single size conveying line to serve all receivers regardless of distance, rate requirement, or material.

The invention technology offers controls and devices that can maximize performance for the variety of conditions that actually exist in a plant.

VFD (Variable Frequency Drive) motors allow vacuum pumps to operate at different speeds, and therefore at different CFM rates, with the vacuum pump pulling different vacuum levels depending on preset information about each receiver being served, and/or making adjustments based on real time feedback of vacuum sensors located at various places in the system.

The addition of a SCFM (Standard Cubic Feet per Minute) limiter in the air flow line allows oversized vacuum pumps to be used without risk of conveying at excessive velocity. SCFM limiters restrict air flow to a preset SCFM. This maintains the desired SCFM air flow at the inlet, which is critical for proper conveying for a given size conveying line. This concept is the subject of pending U.S. patent application Ser. No. 14/185,016.

Reading vacuum levels at various points tells the controlling processor if the line is open, which means only air and no material is present and air is flowing unrestrictedly. This signals a loss of material at the source. A high vacuum reading indicates a plugged or nearly plugged line. Normal conditions are present where material is flowing correctly at detected mid-vacuum levels.

One line size for all receivers assures the resin transport velocity is more likely to be in the acceptable range. However, most processes require the base resin material be delivered at 50 times the rate of additives, such as color concentrate. Virgin (or natural) pellets may have to be loaded at a rate of 1000 pounds per hour, requiring a 2.5 or 3 inch line size, while color is only required to be delivered at a rate of 20 to 40 pounds an hour. A smaller receiver is used for color, namely a receiver one that loads perhaps 5 pounds at a time, while the receiver for the virgin resin material will be larger, perhaps loading 50 pounds of each load cycle. A 2.5 inch line on a 5 pound receiver would be too large. 1.5 inch line would be standard, and the use of 1.5 inch resin conveying line would be better. But this risks velocities that are excessive. This results in trade-offs in design.

By placing a flow limiter at the pump suction intake, one can limit the maximum SCFM air flow to the design limit of the air flow limiter device; this is disclosed and claimed in pending U.S. patent application Ser. No. 14/185,016, noted above.

INCORPORATION BY REFERENCE UNDER 37 CFR 1.57(d)

Applicant hereby incorporates by reference the disclosures of U.S. Pat. No. 8,070,844 and U.S. Pat. No. 8,753,432, both issued in the name of Stephen B. Maguire.

SUMMARY OF THE INVENTION

In one of its aspects, this invention provides apparatus for pneumatically conveying granular plastic resin material where the apparatus includes a vacuum pump having a suction intake, a resin supply, a conduit connecting the resin supply to the suction intake, a means for monitoring a level of vacuum being drawn by the vacuum pump at the suction inlet, and a valve for supplying air to the conduit at a location proximate to the resin supply to maintain a desired suction level.

The valve for supplying air to the conduit is preferably located at a position upstream of the first receiver; namely the receiver farthest removed from the vacuum pump. Alternatively, the valve for supplying air to the conduit may be located upstream of at least one of the receivers. The vacuum pump may be a constant speed vacuum pump. Use of a variable speed vacuum pump is also within the scope of this invention.

In yet another of its aspects, this invention provides apparatus for pneumatically conveying plastic resin material where the apparatus includes a vacuum pump having a suction intake, a conduit connecting a resin supply to the suction intake, means for measuring the velocity of the air stream being drawn by the vacuum pump at the vacuum pump suction inlet and a valve for supplying air to the conduit at a location proximate the resin supply to maintain a desired suction level. In this aspect of the invention, the valve for supplying air to the conduit is preferably located at a position upstream of the first receiver; alternatively, the valve for supplying air to the conduit may be located upstream of at least one of the receivers. In this aspect of the invention, the vacuum pump may be a constant speed pump, or a variable speed vacuum pump. In this aspect of the invention, the apparatus may further optionally include one or more digital devices, preferably one or more microprocessors, to regulate operation of the invention as regarding supply of granular plastic resin material to a given receiver or receivers when the given receiver or receivers require additional plastic resin material. Connection between the digital device, preferably a microprocessor, and the receivers, and, further optionally, valves regulating input and discharge by such receivers, may be wireless, over the Internet, or otherwise via an Ethernet connection.

In yet another one of its aspects, this invention provides a method for conveying granular resin material from a supply thereof through a conduit to a receiver for furnishing granular resin to a process machine where the method includes measuring speed of air moving through the conduit at a selected position, comparing the measured air speed to a pre-selected acceptable range of air speeds, and introducing air into the conduit when the measured air speed is outside the pre-selected acceptable speed range to maintain a desired suction level. The method may further include introducing air into the conduit in a metered amount when introduced. The metering of air into the conduit may be performed upstream of the first receiver, or elsewhere.

In still yet another one of its aspects, this invention provides a method for conveying granular resin material from a supply thereof through a conduit to a receiver for furnishing granular resin material to a process machine where the method includes measuring vacuum level within a conduit carrying the granular resin material from the supply to a receiver, and/or measuring vacuum level in a conduit pulling vacuum from the receiver to a vacuum pump, comparing the measured vacuum level to a pre-selected acceptable range of vacuum levels at the position of measurement, and introducing air into the conduit when the measured vacuum level is outside the pre-selected acceptable range to maintain a desired, effective transport within the conduit.

The foregoing outlines rather broadly features of the present invention in order that the detailed description of the invention that follows may be best understood. Additional features and advantages of the invention may be described hereinafter which may form the subject of certain of the claims of the application. It should be appreciated by those skilled in the art that the concepts and specific embodiments disclosed herein may be readily utilized as a basis for modifying or designing other structures or methods for carrying out the goals and results attained by this invention. It should also be realized by those skilled in the art that such equivalent constructions do not depart from the spirit and scope of the invention as set forth in the appended claims.

In reference to the drawings where like reference numbers are identical to those used in this description to designate like or similar elements throughout the various views, illustrative embodiments of the invention are shown and described. The figures are not to scale, and in some instances, the drawings have been exaggerated and/or simplified in part for illustrative purposes only. One of skill in the art will appreciate the many possible applications and variations of the invention that are possible based on the following illustrative embodiments of this invention.

DETAILED DESCRIPTION OF THE INVENTION

In this application, unless otherwise apparent from the context it is to be understood that the use of the term "vacuum" means "air at slightly below atmospheric pressure." The "vacuum" (meaning air at slightly below atmospheric pressure) provides a suction effect that is used to draw granular plastic resin material out of a supply and to convey that granular plastic resin material through various conduits to receivers where the granular resin material can be temporarily stored before being molded or extruded. Hence, when reading this application it is useful for the reader mentally to equate the term "vacuum" with the term "suction".

Figure 1:
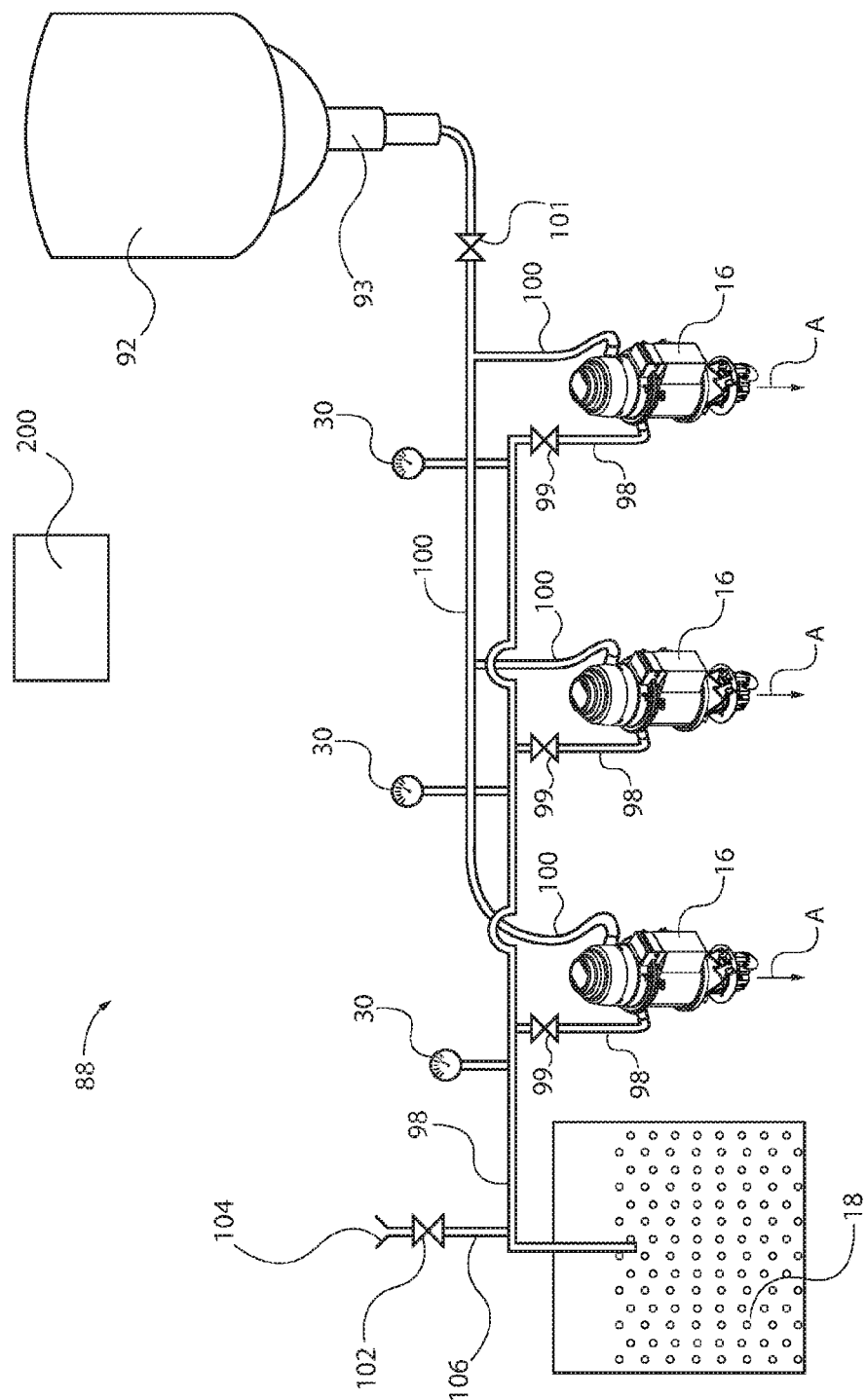
FIG. 1 is a schematic representation of a resin delivery system manifesting aspects of the invention.
Figure 2:
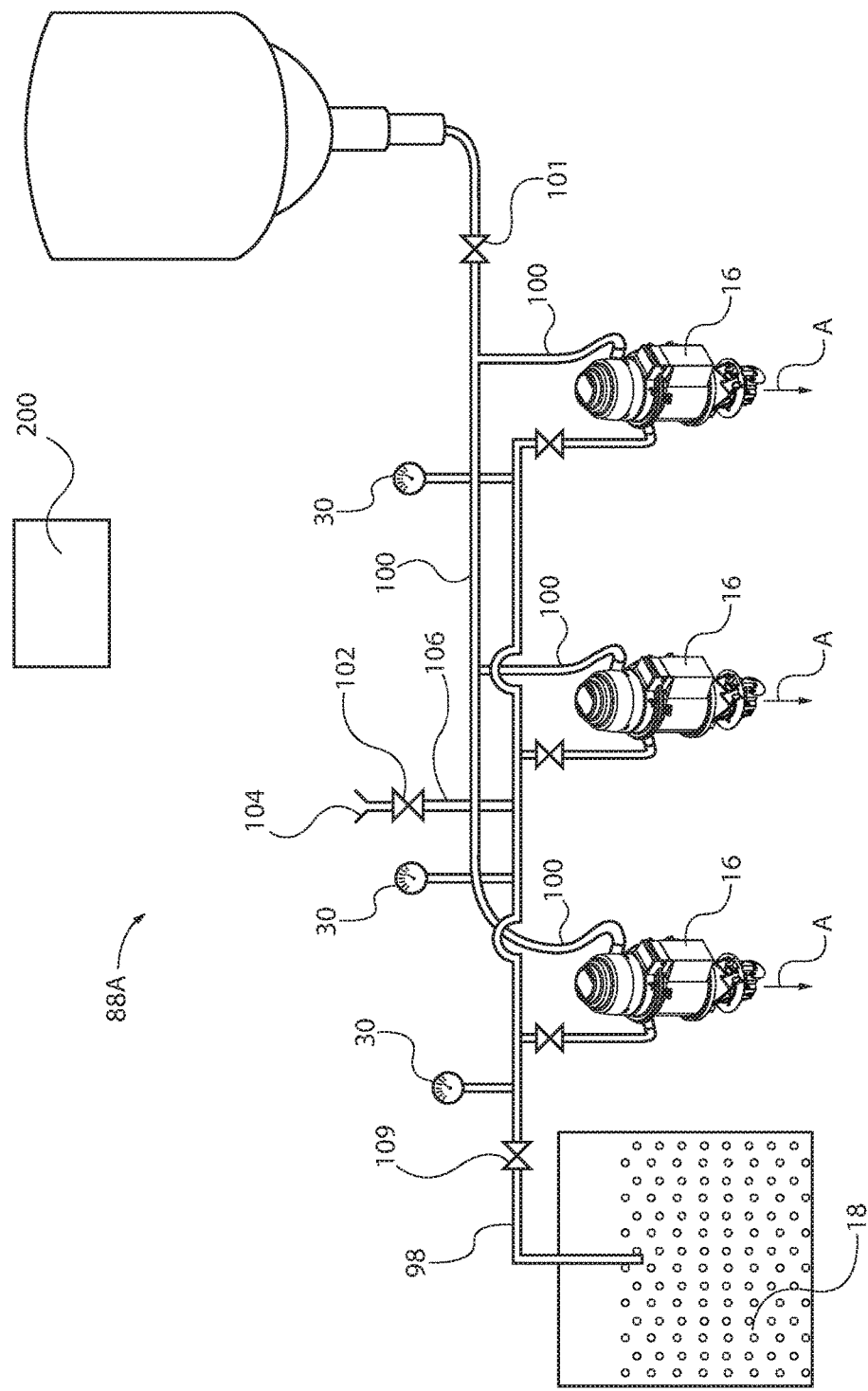
FIG. 2 is a schematic representation of an alternate a resin delivery system manifesting aspects of the invention.

Referring to FIGS. 1 and 2, apparatus for conveying granular plastic resin material from the supply to receivers that retain and dispense the resin material when needed by a process machine is illustrated. The apparatus, which is designated generally 88 in FIG. 1, preferably includes a vacuum pump designated generally 92 and shown schematically in FIG. 1.

Still referring to FIGS. 1 and 2, vacuum drawing conduit 100 is connected to a plurality of receivers 16, each of which receives, retains and dispenses, as needed, granular plastic resin material to a process machine, such as a granulator blender, or an extruder, or a molding press as located preferably below a receiver 16. Arrows A in the drawing figures are provided to schematically indicate the downward discharge of granular resin material from a receiver 16. Such downward discharge of granular resin material is regulated by a controller, desirably a controller such as microprocessor 200. Discharge of granular plastic resin from a receiver 16 to an associated process machine in the downward direction indicated by arrow A occurs when the process machine and controls associated therewith call for resin material to be supplied. The process machines are not illustrated to enhance the clarity of the drawings. Receivers 16 are most desirably of the type disclosed in U.S. Pat. No. 8,753,432, incorporated herein by reference as set forth above.

Further illustrated in FIGS. 1 and 2 is a hopper 18 for storage of granular plastic resin material therein and a resin conveying conduit 98, which serves to draw resin from hopper 18 and to deliver the resin through resin conveying conduit 98 to respective receivers 16 as vacuum is drawn by vacuum pump 92, with vacuum propagating through vacuum drawing conduit 100, the various receivers 16, and resin conveying conduit 98, back to hopper 18. In the drawings, the resin conveying conduit 98 has been shown to include a number of resin conveying conduit valves designated 99 in the drawings. Valves 99 are desirably controlled by microprocessor 200 and are optional but desirable as regarding the apparatus and method of the invention. Resin conveying conduit valves 99 are preferably the "open-closed" type. Resin conveying conduit valves 99 are not used, during the normal operation of the invention, to meter the pneumatically conveyed granular resin into an associated receiver 16 through a segment of resin conveying conduit 98. Resin conveying conduit valves 99 are provided principally for shut off purposes in the event shut down of the system is necessary due to a malfunction of the apparatus.

Vacuum drawing conduit 100 is optionally equipped with a vacuum drawing conduit valve 101. Valve 101 is preferably of the "open-closed" type and is used principally for shut down purposes in the event of a system malfunction. Vacuum drawing conduit valve 101 is optional as respecting operation of either of the embodiments of the apparatus illustrated in FIGS. 1 and 2.

In the embodiment of the apparatus illustrated as 88A in FIG. 2, a master resin conveying conduit valve 109 is illustrated. Master resin conveying conduit valve 109 is desirably of the "open-closed" type and is provided principally for safety and equipment protection purposes in the event of a system or apparatus malfunction. Master resin conveying conduit valve 109 is preferably controlled by microprocessor 200. Master resin conveying conduit valve 109 is optional as respecting apparatus 88A illustrated in FIG. 2.

During operation of the resin conveying systems shown schematically in FIGS. 1 and 2, upon actuation of vacuum pump 92, a vacuum is drawn at vacuum pump suction head 93. This vacuum, as it propagates back to hopper 18, serves to draw resin out of hopper 18 and into respective receivers 16.

Referring specifically to FIG. 1, an air supply conduit 106 connects with resin conveying conduit 98 at the position shown in FIG. 1. A valve 102 admits air through air supply inlet 104 to air supply conduit 106 and hence into resin conveying conduit 98. Valve 102 is preferably a bleed valve that can be adjusted, preferably automatically using a solenoid or other valve adjustment means, most desirably by microprocessor 200, to meter a desired variable amount of air into resin conveying conduit 98. In FIG. 1 air supply conduit 106, air supply inlet 104, and valve 102 are all upstream of all of receivers 16. In other words, all of the air metered into resin conveying conduit 98 to maintain a desired vacuum level within resin conveying conduit 98 will pass through at least one of the receivers 16. In FIG. 1 wire connections between the microprocessor 200 and receivers 16 and vacuum pump 92 have not been illustrated to enhance the clarity of the drawings. As noted above, connection between microprocessor 200 and the other elements in the system, including valve 102 and potentially other, optional valves, may be wireless, most preferably via the Internet.

In FIG. 1 item 30 located at the vacuum pump suction head 93, may be a vacuum gauge or a vacuum sensor to measure and monitor the level (in the case of a vacuum gauge) or presence (in the case of a vacuum sensor) of vacuum being drawn by vacuum pump 92 at the vacuum pump suction head inlet 93. In such case, the vacuum gauge is preferably connected electronically or wirelessly, preferably via the Internet, to a control and feedback system including microprocessor 200 for regulating valve 102 and the amount of air supplied to resin conveying conduit 98 through air supply conduit 106, thereby to maintain a desired level of vacuum at vacuum pump suction head 93. Alternatively, item 30 in FIG. 1 may be an anemometer or similar device for measuring velocity of the air stream being drawn by vacuum pump 92 at vacuum pump suction head 93. Similarly to the vacuum gauge/vacuum sensor approach discussed immediately above, the anemometer approach preferably uses a digital anemometer connected with feedback circuitry or wirelessly, preferably via the Internet, to valve 102 in order to regulate the amount of air furnished to resin conveying conduit 98 through air supply conduit 106, thereby to maintain a desired vacuum level at vacuum pump suction head 93.

Referring to FIG. 2, the apparatus is similar to that illustrated in FIG. 1 except for the position of air supply inlet 104, air metering valve 102, and air supply conduit 106. In FIG. 2, air supply conduit 106 supplies air to resin conveying conduit 98 at a position downstream of at least one of receivers 16. Other than the position of air supply conduit 106, air supply inlet 104, and valve 102, as shown in FIG. 2, the apparatus illustrated in FIG. 2 is preferably identical to that as shown in FIG. 1 and described above.

In the apparatus illustrated, vacuum pump 92 may be a constant speed vacuum pump as illustrated schematically in FIG. 1 and in FIG. 2, or vacuum pump 92 may have a variable speed drive or variable speed component thereof.

Although embodiments of the present invention and at least some of its advantages have been described in detail hereinabove, it should be understood that various changes, substitutions and alterations may be made to the apparatus and methods disclosed herein without departing from the spirit and scope of the invention as defined by the appended claims. Moreover, the scope of this patent application is not intended to be limited to the particular embodiments of the apparatus and methods described in the specification, nor to any methods of manufacture, compositions of matter, and the like that may be described or inferentially understood by those skilled in the art to be present in the invention as described in this specification.

As one of skill in the art will readily appreciate from the disclosure of the invention as set forth hereinabove, processes, manufacturers, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

In the claims appended hereto, it is to be understood that the term "comprising" means "including but not limited to", whereas the term "consisting of" means "having only and no more" and the term "consisting essentially of" means "having only and no more except for minor additions which would be known to one of skill in the art" as possibly needed for operation of the invention.

The following is claimed:

1. Apparatus for pneumatically conveying granular plastic resin material out of a resin supply to at least one receiver, consisting of:
   a) a vacuum pump having a suction intake;
   b) a first conduit connecting the resin supply to the receiver;
   c) a second conduit connecting the receiver to the suction intake;
   d) means for monitoring the level of vacuum being drawn by the vacuum pump at the suction inlet;
   e) a valve responsive to the means for monitoring for supplying air to the conduit at a location proximate the resin supply in an amount to maintain a desired level of vacuum, at the vacuum pump suction inlet, drawn by the vacuum pump.

2. Apparatus for pneumatically conveying granular plastic resin material out of a resin supply consisting of:
   a) a vacuum pump having a suction intake;
   b) a conduit connecting the resin supply to the suction intake;
   c) means for measuring the velocity of the air stream being drawn by the vacuum pump at the vacuum pump suction inlet;
   d) a valve responsive to the means for measuring for supplying air to the conduit at a location proximate the resin supply in an amount to maintain a desired velocity, at the vacuum pump suction inlet, of the air stream drawn by the vacuum pump.

3. The apparatus of claim 1 wherein the valve for supplying air to the conduit is located at a position upstream of at least one receiver as recited in claim 1.

4. Apparatus for pneumatically conveying granular plastic resin material out of a resin supply to at least one receiver, comprising:
   a) a vacuum pump having a suction intake;
   b) a first conduit connecting the resin supply to the receiver;
   c) a second conduit connecting the receiver to the suction intake;
   d) means for monitoring the level of vacuum being drawn by the vacuum pump at the suction inlet; and
   e) a valve responsive to the means for monitoring for supplying air to the conduit at a location proximate the resin supply in an amount to maintain a desired level of vacuum drawn by the vacuum pump, the valve for supplying air to the conduit being located upstream of the receivers.

5. The apparatus of claim 1 wherein the vacuum pump is a constant speed pump.

6. The apparatus of claim 2 wherein the valve for supplying air to the conduit is located at a position upstream of the first receiver.

7. Apparatus for pneumatically conveying granular plastic resin material out of a resin supply comprising:
   a) a vacuum pump having a suction intake;
   b) a conduit connecting the resin supply to the suction intake;
   c) means for measuring the velocity of the air stream being drawn by the vacuum pump at the vacuum pump suction inlet;
   d) a valve responsive to the means for measuring for supplying air to the conduit at a location proximate the resin supply in an amount to maintain a desired velocity of the air stream drawn by the vacuum pump, the valve for supplying air to the conduit being is located upstream of the receivers.

8. The apparatus of claim 2 wherein the vacuum pump is a constant speed pump.

9. In a method for automatically regulating pneumatic conveyance of granular resin from a supply thereof through a conduit to a receiver furnishing the granular resin to a process machine, the improvement comprising:
   a) measuring pressure of air moving through the conduit at the suction intake of the vacuum pump during pneumatic conveyance of granular resin along the conduit interior;
   b) comparing measured air pressure at the suction intake of the vacuum pump to a pre-selected acceptable range of air pressures as the air moves the granular resin along the conduit interior; and
   c) introducing air into the conduit as the granular resin moves along the conduit interior when measured air pressure at the suction intake of the vacuum pump is outside the pre-selected acceptable range for pneumatic conveyance of granular resin along the conduit interior.

10. The method of claim 9 wherein the air pressure is subatmospheric.

11. Apparatus for pneumatically conveying granular plastic resin material out of a resin supply to at least one receiver, comprising:
   a) a vacuum pump having a suction intake;
   b) a first conduit connecting the resin supply to the receiver;
   c) a second conduit connecting the receiver to the suction intake;
   d) means for monitoring the level of vacuum being drawn by the vacuum pump at the suction inlet; and
   e) a valve responsive to the means for monitoring for supplying air to the conduit at a location proximate the resin supply in an amount to maintain a desired level of vacuum drawn by the vacuum pump, the valve for supplying air to the conduit being located among the receivers.

12. Apparatus for pneumatically conveying granular plastic resin material out of a resin supply comprising:
   a) a vacuum pump having a suction intake;
   b) a conduit connecting the resin supply to the suction intake;
   c) means for measuring the velocity of the air stream being drawn by the vacuum pump at the vacuum pump suction inlet;
   d) a valve responsive to the means for measuring for supplying air to the conduit at a location proximate the resin supply in an amount to maintain a desired velocity of the air stream drawn by the vacuum pump, the valve being located among the receivers.

13. In a method for regulating pneumatic conveyance of granular resin from a supply thereof through a conduit to a receiver furnishing the granular resin to a process machine, the improvement comprising:
   a) measuring velocity of air moving through the conduit at the suction intake of the vacuum pump during pneumatic conveyance of granular resin along the conduit interior;
   b) comparing measured air velocity at the suction intake of the vacuum pump to a pre-selected acceptable range of air velocities as the air moves the granular resin along the conduit interior; and
   c) introducing air into the conduit as the air moves the granular resin along the conduit interior when measured air velocity at the suction intake of the vacuum pump is outside the pre-selected acceptable range for pneumatic conveyance of granular resin along the conduit interior.

* * * * *